(12) United States Patent
Hackl et al.

(10) Patent No.: US 10,434,991 B2
(45) Date of Patent: Oct. 8, 2019

(54) PRETENSIONING DEVICE FOR A WINDSCREEN WIPING DEVICE

(71) Applicant: Robert Bosch GmbH, Stuttgart (DE)

(72) Inventors: Viktor Hackl, Sopron (HU); Peter Deak, Budapest (HU); Michael Weiler, Buehl (DE); Attila Geleta, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 649 days.

(21) Appl. No.: 14/917,329

(22) PCT Filed: Aug. 6, 2014

(86) PCT No.: PCT/EP2014/066926
§ 371 (c)(1),
(2) Date: Mar. 8, 2016

(87) PCT Pub. No.: WO2015/032573
PCT Pub. Date: Mar. 12, 2015

(65) Prior Publication Data
US 2016/0221541 A1    Aug. 4, 2016

(30) Foreign Application Priority Data

Sep. 9, 2013 (DE) .......................... 10 2013 217 945

(51) Int. Cl.
*B60S 1/38* (2006.01)
*B60S 1/34* (2006.01)
*B60S 1/40* (2006.01)

(52) U.S. Cl.
CPC . *B60S 1/38* (2013.01); *B60S 1/34* (2013.01); *B60S 1/3411* (2013.01);
(Continued)

(58) Field of Classification Search
CPC ....................... B60S 2001/3812; B60S 1/3801
See application file for complete search history.

(56) References Cited

U.S. PATENT DOCUMENTS 2,596,063 A    5/1952  Anderson
3,177,514 A    4/1965  Wise
(Continued)

FOREIGN PATENT DOCUMENTS

DE    102013214064 A1    5/2014
EP    0930207            7/1999
(Continued)

OTHER PUBLICATIONS

International Search Report for Application No. PCT/EP2014/066926 dated Nov. 14, 2014 (English Translation, 2 pages).
(Continued)

*Primary Examiner* — Andrew A Horton
(74) *Attorney, Agent, or Firm* — Michael Best & Friedrich LLP

(57) ABSTRACT

The present invention relates to a windscreen wiping device (100) for a vehicle, comprising a wiper blade (2) with an elongate upper part (10) and an elongate lower part (12), which are configured to be at least partially bendable. Furthermore, a plurality of connecting elements (18) for connecting the upper part (10) and the lower part (12) are provided, said connecting elements being spaced apart from one another along a longitudinal extent (8) of the windscreen wiping device and being designed to permit a movement of the upper part (10) and of the lower part relative to each other with a movement component along a longitudinal extent (8) of the windscreen wiping device. Furthermore, the windscreen wiping device has a pretensioning device (50), wherein the pretensioning device has a force-absorbing element (32) which is connected to a force transmission element (33) such that, in the event of a dynamic effect on the force-absorbing element (32) in the direction of the elongate lower part (12), a rotational movement of the force transmission element (33) is brought about, thus resulting in
(Continued)

Fig. 2 a movement of the elongate upper part (10) relative to the elongate lower part with a movement component along a longitudinal extent (8) of the windscreen wiping device.

19 Claims, 7 Drawing Sheets

(52) U.S. Cl.
CPC ............... *B60S 1/3801* (2013.01); *B60S 1/40* (2013.01); *B60S 2001/3812* (2013.01); *B60S 2001/3813* (2013.01); *B60S 2001/4096* (2013.01)

(56) References Cited

U.S. PATENT DOCUMENTS 3,218,664 A 11/1965 Wise
3,224,028 A 12/1965 Lucien et al.
3,263,262 A 8/1966 Wise
6,301,742 B1 * 10/2001 Kota .................... B60S 1/32
                                                       15/250.361

FOREIGN PATENT DOCUMENTS

| FR | 1033521 | 7/1953 |
| FR | 2712859 | 6/1995 |
| GB | 1425568 | 2/1976 |
| JP | S61146658 A | 7/1986 |
| WO | 2015032573 A1 | 3/2015 |

OTHER PUBLICATIONS

International Search Report for Application No. PCT/EP2015/065798 dated Oct. 8, 2015 (English Translation, 3 pages).

* cited by examiner

PRETENSIONING DEVICE FOR A WINDSCREEN WIPING DEVICE

BACKGROUND OF THE INVENTION

The invention relates to a windshield wiper device for a vehicle, in particular a motor vehicle, furthermore in particular a pretensioning device for a windshield wiper device.

Windshield wiper devices typically have a wiper arm or wiper lever, wherein a wiper blade is moved on the windshield of a motor vehicle. In this instance, the wiper blade is moved between a first turning position and a second turning position. To this end, the wiper arm is connected to a wiper motor by means of the drive shaft. In particular on windshields with great changes of curvature, the wiper blade easily loses contact with the windshield. In particular with highly curved windshields, this may lead to unwiped wiping regions or to the formation of haze.

Since a wiping operation has to be optimized for a large number of parameters, such as, for example, a quantity of rain on the windshield, a snow load which may occur, the speed of the vehicle and associated wind pressure on the wiper arm, it is not readily possible to reliably prevent a haze formation by adapting the pressure of the wiper arm to the windshield. Therefore, it is necessary to further improve windshield devices.

In the improvement, there are a plurality of peripheral conditions which should further be taken into account. These include the complexity in terms of the production or the production costs, the material costs, but also the properties of the windshield wiper device, in particular the function under a variety of conditions and the service-life under a large number of conditions. It should be taken into account for wiper devices for vehicles that the cost pressure constantly increases and that the vehicles can be used in a large number of climatic conditions so that, for example, extreme temperature values occur permanently and/or with large fluctuations.

SUMMARY OF THE INVENTION

An object of the present invention is to ensure reliable, substantially haze-free wiping of a windshield of a vehicle.

According to embodiments of the present invention, there is proposed a windshield wiper device for a vehicle, in particular for a motor vehicle. The windshield wiper device comprises a wiper blade having an elongate upper portion and an elongate lower portion, which are constructed so as to be at least partially bendable. Furthermore, there are provided a plurality of connection elements which are for connecting the upper portion and the lower portion, wherein the connection elements are spaced apart from each other over a longitudinal extent of the windshield wiper device. The connection elements are configured to enable a movement of the upper portion and the lower portion relative to each other with a movement component over a longitudinal extent of the windshield wiper device. Furthermore, the windshield wiper device has a pretensioning device, wherein the pretensioning device comprises a force receiving element which is connected to a force transmission element so that a rotational movement of the force transmission element is brought about in the event of a force action on the force receiving element in the direction of the elongate lower portion, whereby a movement of the elongate upper portion results relative to the elongate lower portion with a movement component over a longitudinal extent of the windshield wiper device.

According to the embodiments of the invention described herein, windshield wiper devices can be produced for vehicles in a particularly advantageous manner and for a plurality of different fields of application. The present embodiments of the windshield wiper device with the pretensioning device according to the embodiments described herein enable a particularly good adaptation to the curvature of a windshield. This ensures particularly good and precise wiping of the windshield. Regions of the windshield which are not wiped and a formation of haze on the windshield can be extensively avoided. The structural configuration of the pretensioning device described herein enables an extensively uniform pressing pressure of the windshield wiper device on the windshield so that a high wiping quality is provided.

According to embodiments of the windshield wiper device which can be combined with other embodiments, the pretensioning device comprises a stop which is spaced apart from the lower portion in order to fix a ratio between a pretensioning force $F_V$ and a pressing force $F_P$ of the windshield wiper device. Consequently, there is provided a windshield wiper device with which the ratio between a pretensioning force $F_V$ and a pressing force $F_P$ can be adjusted so that a better wiping result is achieved in comparison with conventional windshield wiper devices.

According to embodiments of the windshield wiper device which can be combined with other embodiments, the force transmission element is connected at a first end to the elongate upper portion via a first pivot joint. The force transmission element is further connected at a second end to the force receiving element via a second pivot joint. It is thereby readily possible to effectively produce, by means of the pretensioning device, a pretensioning force $F_V$ which acts on the upper portion, in particular in the direction of the longitudinal extent of the upper portion.

According to embodiments of the windshield wiper device which can be combined with other embodiments, the force transmission element is arranged in such a manner that, when the windshield wiper device is in an unloaded state, an angle α between a longitudinal axis of the force transmission element and a perpendicular to a movement direction of the force receiving element in the event of a force action on the force receiving element is in an angular range from at least 15°, in particular from at least 20°, up to a maximum of 60°, in particular up to a maximum of 45°. As a result of the selection of the angle α between the longitudinal axis of the force transmission element and the perpendicular to a movement direction of the force receiving element, the ratio between a pretensioning force $F_V$ and a pressing force $F_P$ can be adjusted.

According to embodiments of the windshield wiper device which can be combined with other embodiments, the stop is connected to the force receiving element, wherein the stop is configured to limit a movement of the force receiving element in the direction of the elongate lower portion to a maximum movement path of 20 mm, in particular 15 mm, in particular 10 mm, in the event of a force action on the force receiving element. Consequently, there is provided a windshield wiper device with which the ratio between a pretensioning force $F_V$ and a pressing force $F_P$ can be adjusted so that a better wiping result is achieved in comparison with conventional windshield wiper devices.

According to embodiments of the windshield wiper device which can be combined with other embodiments, the stop is constructed in a pin-like manner and arranged in order to form a stop in the case of the maximum movement path of the force receiving element with the elongate lower portion. Consequently, a simple and cost-effective pretensioning device for a windshield wiper device is provided in accordance with the embodiments described herein.

According to embodiments of the windshield wiper device which can be combined with other embodiments, there is provided a guide in order to guide a movement of the force receiving element in the direction of the elongate lower portion. Consequently, a particularly stable pretensioning device for a windshield wiper device can be provided.

According to embodiments of the windshield wiper device which can be combined with other embodiments, there is further provided a wiper arm in order to apply a pressure force to the force receiving element. As a result, there is provided a windshield wiper device with which a pressure force can readily be applied to the force receiving element so that a pretensioning of the windshield wiper device is achieved.

According to embodiments of the windshield wiper device which can be combined with other embodiments, there is further provided a tension production device in order to apply a tensile force to the force receiving element. Consequently, a windshield wiper device having a small structural height and compact construction can be provided because, for example, a wiper arm for applying a force to the force receiving element can be dispensed with.

According to embodiments of the windshield wiper device which can be combined with other embodiments, the stop is configured in order to transmit a force of at least 10 N, in particular at least 15 N, in particular at least 20 N, to the elongate lower portion. Consequently, there may be provided a windshield wiper device which allows a high pressing pressure.

According to another embodiment of the windshield wiper device for a vehicle, in particular a motor vehicle, the windshield wiper device comprises a wiper blade 2 having an elongate upper portion 10 which is constructed at least partially in a bendable manner, an elongate lower portion 12 which is constructed at least partially in a bendable manner, and a plurality of connection elements 18 for connecting the upper portion 10 and the lower portion 12, wherein the connection elements 18 are spaced apart from each other over a longitudinal extent 8 of the windshield wiper device. The connection elements 18 are configured in order to allow a movement of the upper portion 10 and the lower portion relative to each other with a movement component over a longitudinal extent 8 of the windshield wiper device. The windshield wiper device further comprises a pretensioning device, wherein the pretensioning device comprises a tension production device 41 which is connected to the lower portion 12 so that, in the event of application of a tensile force to the lower portion 12 in a longitudinal extent of the wiper blade, a contraction of the elongate lower portion is brought about, whereby a movement of the elongate lower portion 12 relative to the elongate upper portion with a movement component over a longitudinal extent of the windshield wiper device results. It is thereby possible to provide a windshield wiper device which is applied and adapted to the curvature of the windshield in a particularly precise manner. In particular, there is thereby provided a windshield wiper device having a smaller construction height, and therefore a compact construction of the windshield wiper device because, for example, a wiper arm for applying a force to the force receiving element can be dispensed with.

BRIEF DESCRIPTION OF THE DRAWINGS

Embodiments of the invention are illustrated in the figures and are described in greater detail below. In the drawings.

DETAILED DESCRIPTION

Figure 1:
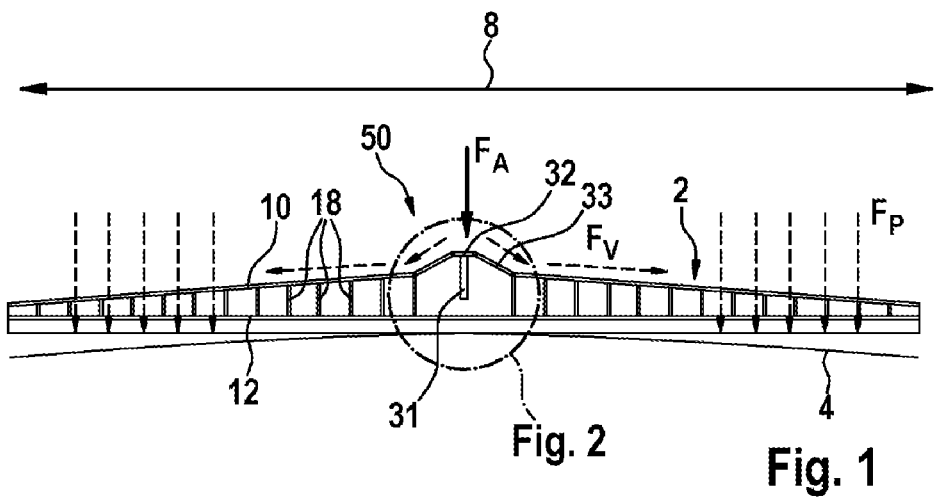
FIG. 1 is a schematic illustration of a wiper blade having a pretensioning device according to embodiments of the windshield wiper device.

Unless otherwise indicated, the same reference numerals are used below for elements which are the same and which have the same effect.

FIG. 1 is a schematic illustration of a windshield wiper device having a wiper blade and a pretensioning device of the windshield wiper device according to embodiments of the disclosure. The windshield wiper device comprises a wiper blade 2 having an elongate upper portion 10 and an elongate lower portion 12 which are constructed to be at least partially bendable. Furthermore, a plurality of connection elements 18 are provided in order to connect the upper portion 10 and the lower portion 12, wherein the connection elements 18 are spaced apart from each other over a longitudinal extent of the windshield wiper device. The connection elements 18 are configured in order to allow a movement of the upper portion 10 and lower portion 12 relative to each other with a movement component over a longitudinal extent 8 of the windshield wiper device. Furthermore, the windshield wiper device has a pretensioning device, wherein the pretensioning device comprises a force receiving element 32 which is connected to a force transmission element 33 so that a rotational movement of the force transmission element 33 is brought about in the event of a force action on the force receiving element 32 in the direction of the elongate lower portion 12, whereby a movement of the elongate upper portion 10 results relative to the elongate lower portion 12 with a movement component over a longitudinal extent 8 of the windshield wiper device.

Consequently, there is provided a windshield wiper device which allows particularly good adaptation to the curvature of a windshield. It is thereby possible to ensure a particularly good and precise wiping action of the windshield. It is possible to substantially prevent non-wiped regions of the windshield and a formation of haze on the windshield. Furthermore, as a result of the constructive configuration of the windshield wiper device described herein, it is possible to precisely adapt the windshield wiper device to changes in curvature occurring within the windshield. A substantially uniform contact pressure on the windshield wiper device, in particular on the lower portion thereof, is also achieved in the case of powerful curvatures and changes in curvature of the windshield. In comparison with conventional windshield wiper devices, it is advantageously unnecessary in the windshield wiper device according to the invention to carry out preceding adjustment of the upper portion and/or the lower portion to the curvature of the windshield to be wiped. The adaptation to the curvature of the windshield is carried out in a rapid, uncomplicated and substantially automatic manner in the windshield wiper device according to the invention. One and the same windshield wiper device can therefore be used for a large number of vehicles for the sake of simplicity.

FIG. 1 illustrates the wiper blade 2 in a position which is not placed on the windshield in such a manner that the lower portion 12 is constructed to be substantially straight. According to other embodiments which can be combined with other embodiments, the lower portion is constructed to be convex in the non-loaded state, that is to say, so as to have a curvature which projects away from the upper portion in a central region. The windshield wiper device according to the embodiment described here can then take up the corresponding concave form of the lower portion, which adapts to the windshield, in the event of contact with a windshield, starting from the convex form of the lower portion.

According to embodiments of the windshield wiper device which can be combined with other embodiments, as illustrated by way of example in FIG. 1, the pretensioning device is connected to the upper portion 10 of the wiper blade 2 in order to produce a pretensioning force FV which acts on the upper portion, in particular in the direction of the longitudinal extent of the upper portion. As illustrated in FIGS. 3A and 3B, a pretensioning of the windshield wiper device can be brought about by application of a force FA to the force receiving element 32. For that purpose, the force transmission element 33 is connected at a first end via a first pivot joint 36 to the elongate upper portion 10 and, at a second end of the force transmission element 33 via a second pivot joint 37, to the force receiving element 32, as illustrated in FIG. 2 by way of example.

If, as shown by way of example in FIGS. 3A and 3B, the force receiving element 32 is moved in the direction of the elongate lower portion in the event of a force FA being applied, for example, by means of a wiper arm, a rotational movement of the force transmission element 33 is thereby brought about, whereby the second pivot joint 37 is displaced outward in the longitudinal direction of the windshield wiper device and a pressure force 56 is applied in the longitudinal extent of the windshield wiper device.

According to other embodiments of the windshield wiper device which can be combined with other embodiments, the pretensioning device 50 comprises a stop 31 which is spaced apart from the lower portion 12 in order to fix a ratio between a pretensioning force $F_V$ and a pressing force $F_P$ of the windshield wiper device. Typically, the stop 31 is arranged below the force receiving element 32. According to embodiments of the windshield wiper device which can be combined with other embodiments, the spacing between the stop 31 and the lower portion 12 is at a maximum 15 mm, in particular at a maximum 10 mm, in particular at a maximum 5 mm. According to embodiments of the disclosure, the pretensioning device 50 is configured so as to fix the ratio between the pretensioning force $F_V$ and the pressing force $F_P$ at a value of at least 0.2, in particular at least 0.4, in particular at least 0.6.

Figure 2:
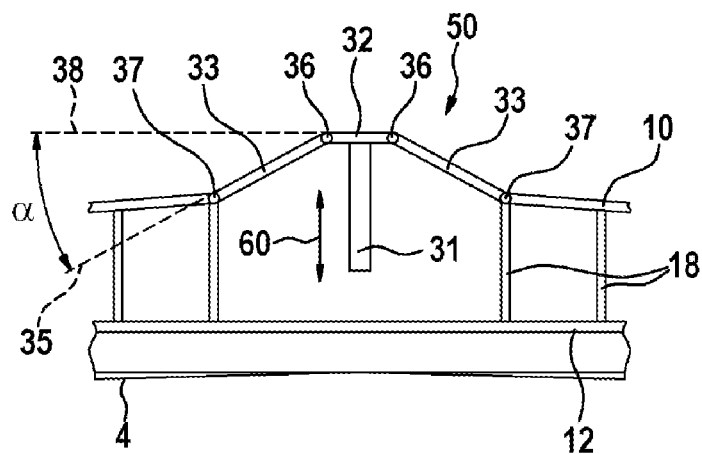
FIG. 2 is a schematic illustration of a pretensioning device of a windshield wiper device according to embodiments of the disclosure.
Figure 3A:
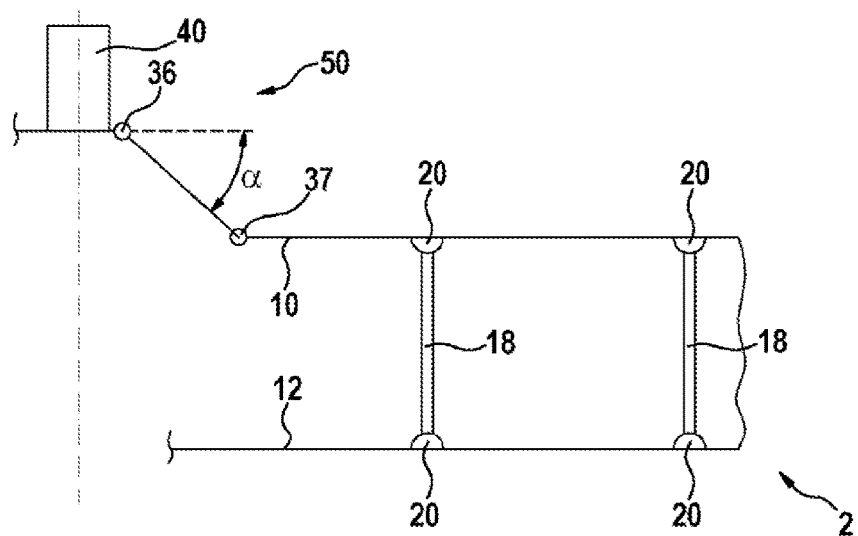
FIG. 3A is a schematic illustration of a cut-out of a windshield wiper device having a wiper arm as a pressure production device in a basic position according to embodiments of the windshield wiper device.
Figure 3B:
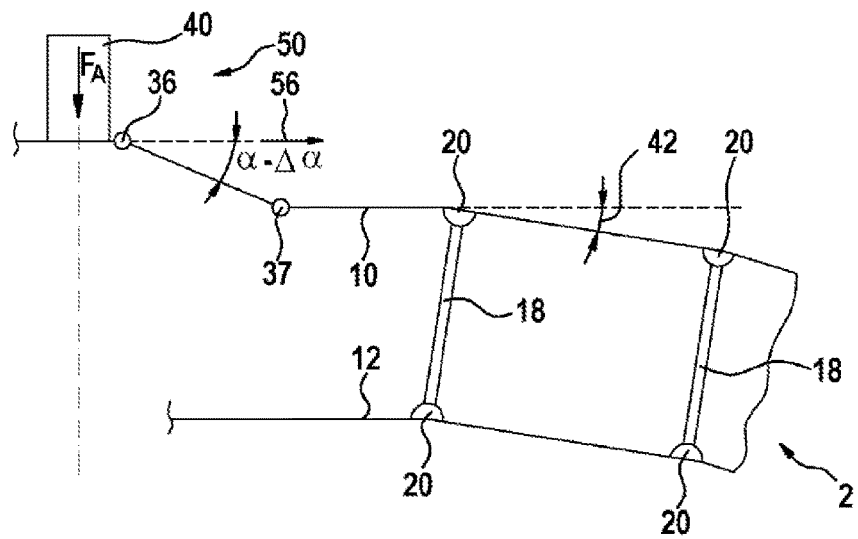
FIG. 3B is a schematic illustration of a cut-out of a windshield wiper device according to FIG. 3A in a position placed on a windshield.

As illustrated by way of example in FIG. 2, the force transmission element 33 is arranged according to embodiments of the windshield wiper device which can be combined with other embodiments in such a manner that, in a non-loaded state of the windshield wiper device, a longitudinal axis 35 of the force transmission element 33 and a perpendicular 38 to a movement direction 60 of the force receiving element 33 encloses an angle α in the event of a force action on the force receiving element 33. Typically, the pretensioning device is configured so that the angle α is in an angular range from at least 10°, in particular from at least 15°, in particular from at least 20°, up to a maximum of 60°, in particular up to a maximum of 45°, in particular up to a maximum of 30°.

As illustrated by way of example in FIG. 2, the stop 31 according to typical embodiments of the windshield wiper device is connected to the force receiving element 32. In particular, the stop 31 may be configured in order to limit, in the event of a force action on the force receiving element 32, a movement of the force receiving element 32 in the direction of the elongate lower portion 12 to a maximum movement path of 20 mm, in particular 15 mm, in particular 10 mm. For example, the stop 31 may be constructed in a pin-like manner. Furthermore, the stop 31 is typically constructed to be rigid so that, after the maximum movement path of the force receiving element 32 with the elongate lower portion 12, a defined stop position can be formed.

FIG. 3A is a schematic illustration of a cut-out of a windshield wiper device according to embodiments of the disclosure with a wiper arm 40 as a pressure production device in a basic position. Typically, the wiper arm 40 is connected at the end of the upper portion 10, at which a retention member 6 for the wiper arm is arranged, as illustrated, for example, in FIGS. 6A and 6B. The end of the upper portion 10 connected to the wiper arm 40 can be guided in the end region thereof by a guide (not illustrated). The wiper arm 40 can apply a force F transversely to the longitudinal extent of the windshield wiper device so that a pretensioning is produced and the windshield wiper device is pressed on the windshield. As a result of the application of a force of the wiper arm in the direction of the windshield, as illustrated in FIG. 3B, a pressure force 56 is applied to the upper portion 10 in the longitudinal extent of the windshield wiper device. As a result of the pressure force 56, the upper portion 10 and the lower portion 12 are bent downward in the direction of the windshield. The pressure force 56 is transmitted to the lower portion 12 via the connection elements 18.

Figure 4A:
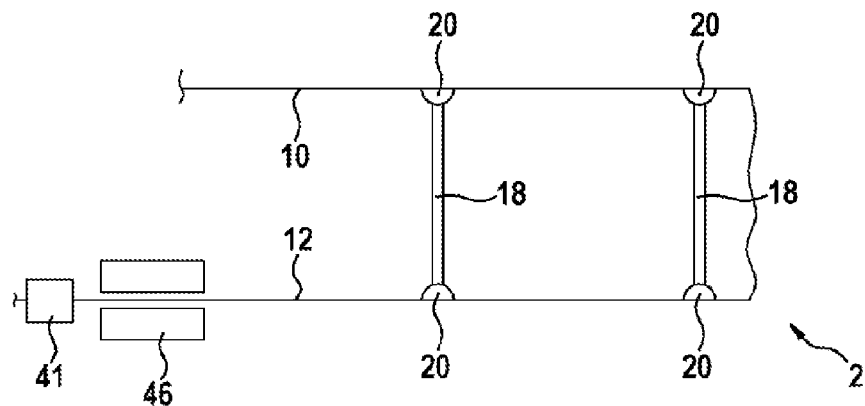
FIG. 4A is a schematic illustration of a cut-out of a windshield wiper device having a tension production device in a basic position according to embodiments of the windshield wiper device.
Figure 4B:
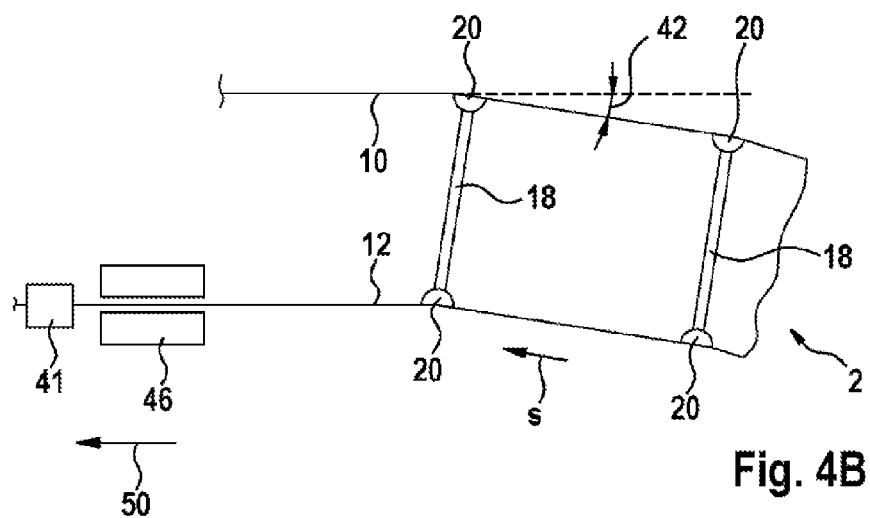
FIG. 4B is a schematic illustration of a cut-out of a windshield wiper device according to FIG. 4A in a position placed on a windshield.

FIG. 4 is a schematic illustration of a cut-out of a windshield wiper device having a tension production device 41 in a basic position (FIG. 4A) and in a position (FIG. 4B) in which the windshield wiper device is placed on a windshield.

According to another embodiment of the windshield wiper device for a vehicle, in particular a motor vehicle, the windshield wiper device comprises a wiper blade 2 having an elongate upper portion 10 which is constructed to be at least partially bendable, an elongate lower portion 12 which is constructed to be at least partially bendable and a plurality of connection elements 18 for connecting the upper portion 10 and the lower portion 12, wherein the connection elements 18 are spaced apart from each other over a longitudinal extent 8 of the windshield wiper device. The connection elements 18 are configured in order to allow a movement of the upper portion 10 and the lower portion relative to each other with a movement component over a longitudinal extent 8 of the windshield wiper device. Furthermore, the windshield wiper device comprises a pretensioning device, wherein the pretensioning device comprises a tension production device 41 which is connected to the lower portion 12 so that, when a tensile force is applied to the lower portion 12 in a longitudinal extent of the wiper blade, a contraction of the elongate lower portion is brought about, whereby a movement of the elongate lower portion 12 results relative to the elongate upper portion with a movement component over a longitudinal extent of the windshield wiper device.

According to embodiments of the windshield wiper device with a tension production device, the end region of the lower portion which is connected to the tension production device 41 can be guided by a guide 46. The tension production device 41 may be an actuator, for example a piezo-actuator, which can carry out longitudinal contractions. To this end, the tension production device 41 can be connected to a control device which controls the tension production device, in particular the actuator, by means of suitable electrical signals. According to embodiments of the disclosure, the control device is constructed in such a manner that it determines the suitable control signals for the tension production device as a result of the curvature of the windshield. As illustrated in FIG. 3B, during such a contraction a tensile force 50 is applied to the lower portion 12 in the longitudinal extent of the windshield wiper device. The windshield wiper device, in particular the lower portion thereof, can thereby be placed on and adapted to the curvature of the windshield in a particularly precise manner. The tensile force is transmitted in this instance in particular by means of the connection elements 18 to the upper portion 10.

Figure 5A:
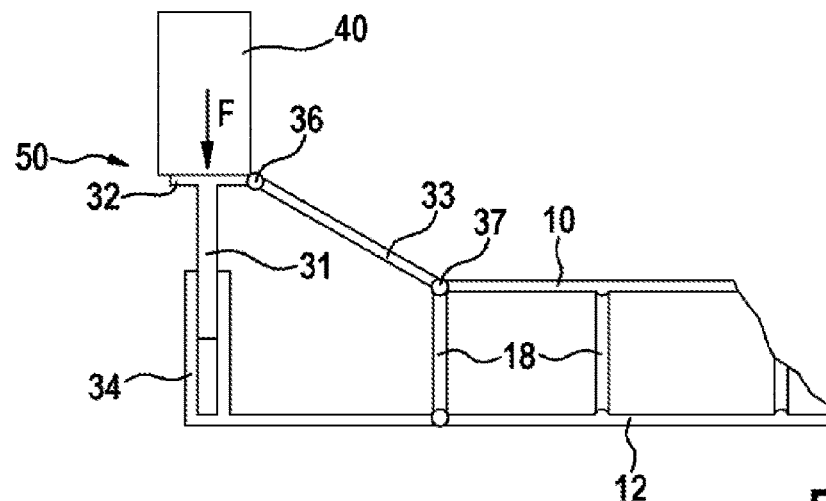
FIG. 5A is a schematic illustration of a cut-out of a windshield wiper device in a basic position having a guide for the stop of a pressure production device according to embodiments of the windshield wiper device.
Figure 5B:
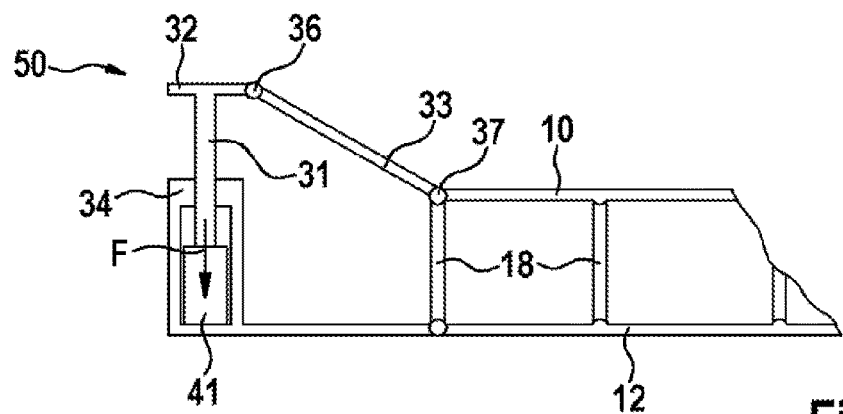
FIG. 5B is a schematic illustration of a cut-out of a windshield wiper device in a basic position having a guide for the stop of a tension production device according to embodiments of the windshield wiper device.

According to embodiments of the windshield wiper device, as illustrated by way of example in FIG. 5A, the windshield wiper device comprises a guide 34 for the stop 31. The guide 34 may be arranged in such a manner that the stop 31 is guided in the direction of the elongate lower portion 12. The movement of the stop 31 in the direction of the elongate lower portion 12 can be carried out by means of a pressure production device, for example, by means of a wiper arm 40, as schematically illustrated in FIG. 5A, or by means of a tension production device 41, as illustrated in FIG. 5B by way of example. The windshield wiper device is illustrated in a basic position in both FIG. 5A and FIG. 5B.

According to embodiments of the windshield wiper device in which a tension production device 41 is used, the tension production device 41 may be constructed in such a manner that the stop 31 during a movement in the direction of the elongate lower portion 12 is moved at least partially inside the tension device 41. In this instance, the stop 31 can be constructed in such a manner that it can be recessed at least partially in the tension production device 41, as illustrated in FIG. 5B.

According to embodiments of the windshield wiper device which can be combined with other embodiments described herein, the stop 31 is configured in order to transmit a force of at least 10 N, in particular at least 15 N, in particular at least 20 N, to the elongate lower portion 12.

Exemplary embodiments of the windshield wiper device, for which the pretensioning device described herein can advantageously be used, are described below.

Figure 6A:
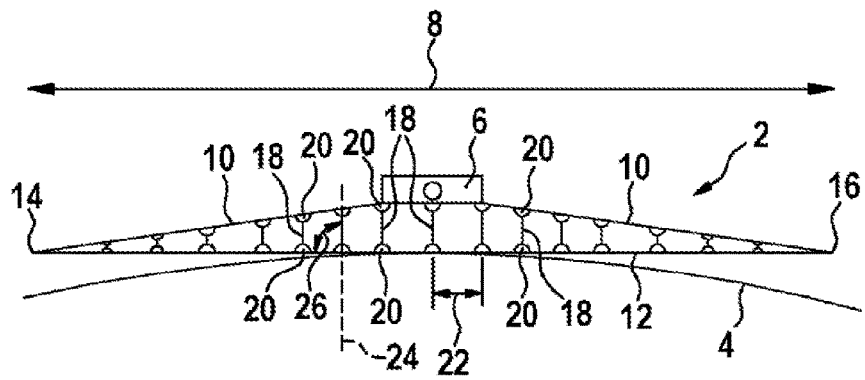
FIG. 6A is a schematic illustration of a wiper blade of a windshield wiper device according to embodiments of the disclosure in a basic position.
Figure 6B:
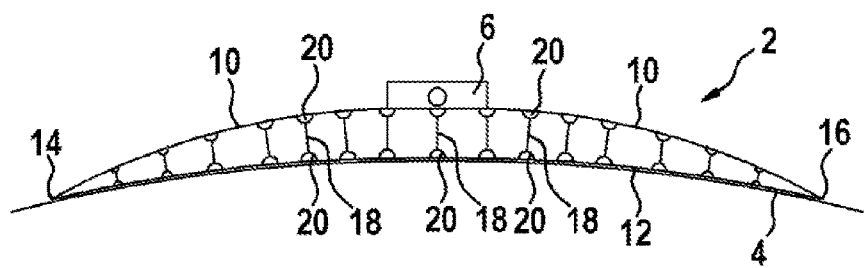
FIG. 6B is a schematic illustration of the wiper blade of a windshield wiper device according to embodiments of the disclosure according to FIG. 6A in a position placed on a windshield.

FIGS. 6A and 6B are schematic illustrations of a wiper blade 2 in a basic position (FIG. 6A) and in a position placed on a windshield (FIG. 6B) according to embodiments of the windshield wiper device of the disclosure. The wiper blade 2 serves to wipe a windshield 4 of a vehicle, which is, for example, a motor vehicle, in particular a car. Generally, the wiper blade 2 is fitted to a windshield wiper arm which is driven for wiping by means of a motor. To this end, the wiper blade 2 has a retention member 6, with which it can be secured to the windshield wiper arm. The wiper blade 2 is located in FIG. 6A in a basic position in which it is at least partially raised from the windshield 4. The wiper blade 2 has a longitudinal extent 8 and has an elongate upper portion 10 and a similarly elongate lower portion 12. The longitudinal extent of the upper portion 10 and the lower portion 12 substantially correspond to the longitudinal extent 8 of the wiper blade 2.

Both the upper portion 10 and the lower portion 12 are bendable bars or may be constructed as bendable bars which are constructed in FIGS. 6A and 6B by way of example in one piece in each case. This enables a particularly stable construction. It is also possible for only a portion of the upper portion 10 and/or the lower portion 12 to be constructed so as to be bendable. Furthermore, it is alternatively possible for the upper portion 10 to be constructed in two parts, wherein a respective end of the two portions of the two-part upper portion 10 are then secured to the retention member 6.

According to some embodiments, which can be combined with the other embodiments described herein, for the upper portion 10 and/or the lower portion 12 there is used a material which has an elasticity modulus which is in a range between 0.005 kN/mm$^2$ and 0.5 kN/mm$^2$, in particular 0.01 kN/mm$^2$ and 0.1 kN/mm$^2$. This enables a suitable flexibility of the upper portion 10 and the lower portion 12. Together with a suitably constructed cross-sectional face of the upper portion 10 and the lower portion 12, an optimum flexural strength is thus produced. The upper portion 10 and the lower portion 12 are thus arranged in such a manner that they face each other. Both ends of the upper portion 10 are securely connected at outer connection positions 14 and 16 to an end of the lower portion 12, respectively. Otherwise, the upper portion 10 and the lower portion 12 are spaced apart from each other.

The upper portion 10 and the lower portion 12 are connected to each other by means of connection elements 18. In particular in the basic position of the wiper blade 2, they extend substantially transversely relative to the longitudinal extent 8 of the wiper blade 2. The connection elements 18 are secured at mutually facing inner longitudinal sides of the upper portion 10 and the lower portion 12 by means of pivot joints 20. The pivot joints 20 are in this instance hinges. In particular, the pivot joints 20 may be constructed as film hinges. This is particularly advantageous when the upper portion 10, lower portion 12 and/or connection elements 18 are produced from a plastics material or are covered with a suitable plastics material.

According to typical embodiments which are described herein and which can be combined with other embodiments described herein, a pivot joint is selected from the following group which comprises: a hinge, a film hinge, a tapering of the material for producing lower rigidity in accordance with a torsion axis, a joint with a rotation axis, a means for connecting the upper portion to the connection element or for connecting the lower portion to the connection element which permits the displacement of the lower portion with respect to the upper portion over the longitudinal extent, etcetera.

Embodiments in which the joint is provided by means of a film hinge consequently provide a very simple manner of providing the joints for a Fin-Ray wiper. The wiper blade 2 can be provided in one piece, in particular in an off-tool manner. According to typical embodiments, the windshield wiper device, in particular the wiper blade, is produced from one or more materials from a group comprising: TPE (thermoplastic elastomer), for example, TPE-S, TPE-O, TPE-U, TPE-A, TPE-V and TPE-E. The film hinges may have a high expandability. This may, for example, be provided by a material selected from the group PP, PE, POM and PA. Alternatively, the film hinges may be produced from one or more materials from a group comprising: TPE (thermoplastic elastomer), for example, TPE-S, TPE-O, TPE-U, TPE-A, TPE-V and TPE-E. The material selection from the group comprising: POM, PA, TPE, in particular TPE-S, TPE-O, TPE-U, TPE-A, TPE-V and TPE-E allows production using the injection-molding method, in particular using a 2-component injection-molding method.

The connection elements 18 are spaced apart from each other over the longitudinal extent of the wiper blade 2. The spacings between two adjacent connection elements 18 are the same. However, they may also be selected to be different. The spacings are advantageously smaller than 50 mm, in particular smaller than 30 mm. It is thereby possible to ensure particularly high flexibility of the windshield wiper device, in particular the lower portion thereof, and good adaptation to the curvature and curvature changes of the windshield to be wiped.

In FIG. 6A in place of the spacings between two connection elements 18 in each case, a spacing 22 is illustrated. The connection elements 18 are, in particular in the basic position of the wiper blade 2, secured to the lower portion 12 in such a manner that the longitudinal axes thereof extend at angles 26 with respect to the lower portion 12 which are between 65° and 115°, in particular between 75° and 105°. In a particularly advantageous manner, the angles are between 80° and 100°. This advantageously ensures a particularly good transmission of a force acting on the lower portion to the upper portion. It is further possible in this manner to achieve a particularly stable windshield wiper device. The same applies to the fixing means of the connection elements 18 to the upper portion 10.

FIG. 6A illustrates by way of example of the longitudinal axes of the connection elements 18 a longitudinal axis 24 and by way of example of the angles between the connection elements 18 and the lower portion 12 an angle 26. The spacings between the upper portion 10 and the lower portion 12 are determined above all by the lengths of the connection elements 18. The lengths of the connection elements 18 increase starting from the two outer connection positions 14, 16 as far as approximately those locations at which the retention member 6 which is fitted to the upper portion 10 begins. The upper portion 10 and lower portion 12 thereby form in the side view of the wiper blade 2 according to FIG. 6A a double-wedge, wherein the tips of the two wedges face in opposing directions. The connection elements 18 are constructed in a buckle-resistant manner.

FIG. 6B is a schematic illustration of the wiper blade 2 according to FIG. 6A in a position placed on the windshield 4. Since the windshield 4 has a curvature, when the wiper blade 2 is placed on the windshield 4, contact pressure forces act on the lower portion 12. Since the upper portion 10 and the lower portion 12 are bendable bars and the connection elements 12 are rotatably supported on the upper portion 10 and lower portion 12, the upper portion 10 and the lower portion 12 can be displaced relative to each other. As a result of the pressure forces acting from below on the lower portion 12, the wiper blade 2 bends in the direction from which the pressure forces originate and is applied precisely with respect to the curvature of the windshield 4.

As a result of the structure of the embodiments described herein, when a force acts on the lower portion (as a result of the windshield 4), there is a bending of the lower portion in the direction from which the force acts. This is produced by means of the connection of the upper portion 10 and the lower portion at a connection position 14 and/or 16, the shape and pivot joints at the connection between the connection elements and the upper or lower portion.

In the illustration according to FIG. 6B, there is provided between the wiper blade 2 and the windshield 4 a small spacing which serves in this instance only to explain the windshield 4 and the wiper blade 2 and which in reality is substantially not present in this manner when the wiper blade 2 is placed on the windshield 4. Furthermore, there is typically at the lower side of the lower portion 12 facing away from the upper portion 10 a wiper lip which is placed for wiping on the windshield 4. For reasons of clarity, the wiper lip is not illustrated in FIGS. 5A and 5B.

A windshield wiper device according to embodiments described herein uses the effect of tail fins of specific fish, which in the event of lateral pressure do not deviate in the pressure direction, but instead curve in the opposite direction, that is to say, in the direction from which the pressure originates. This principle is also referred to as the "fin ray" principle. A windshield wiper device according to the embodiments described herein thereby has the advantage of improved adaptation to a windshield of a motor vehicle. With a conventional windshield wiper blade, the upper portion thereof is generally rigid, that is to say, it is constructed so as not to be bendable.

FIGS. 6A and 6B show a wiper blade 2 with a longitudinal extent 8 which extends substantially between the connection positions 14 and 16. Such an arrangement is often used for front windshield wipers. Alternatively, however, a windshield wiper device may also have only one connection position which by analogy with FIGS. 6A and 6B corresponds to a halving of the windshield wiper device, and wherein, for example, at a position of the retention member 6 a rotation axis is provided. Such an arrangement is often used for rear windshield wipers. This is illustrated by way of example inter alia in FIGS. 7A and 7B. Optional embodiments and details, as described in the individual embodiments, can generally be used for both variants of an arrangement of a windshield wiper device.

Figure 7A:
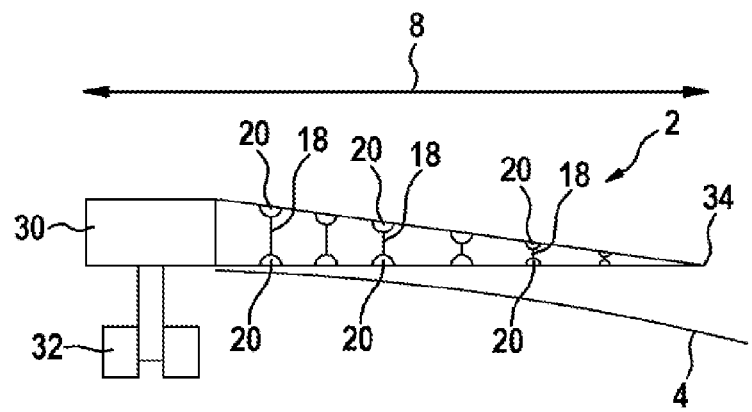
FIG. 7A is a schematic illustration of another embodiment of a windshield wiper device according to the invention in the form of a wiper arm with an integrated wiper blade in a basic position.

FIG. 7A is a schematic illustration of another embodiment of the windshield wiper device according to the invention in the basic position. The windshield wiper device is in this instance a wiper arm with an integrated wiper blade 2, which is fitted to a securing portion 30. The securing portion 30 is connected to a wiper motor 32 which drives the securing portion 30 for wiping the windshield 4. The wiper blade 2 is constructed in a wedge-shaped manner, wherein an end of the upper portion 10 at an outer connection position 34 is securely connected to an end of the lower portion 12. The other end of the upper portion 10 and the lower portion 12 is secured to the securing portion 30, respectively. With regard to the basic structure and in particular the securing means of the connection elements 18, the windshield wiper device according to FIG. 7A in principle corresponds to the one according to FIG. 6A.

Figure 7B:
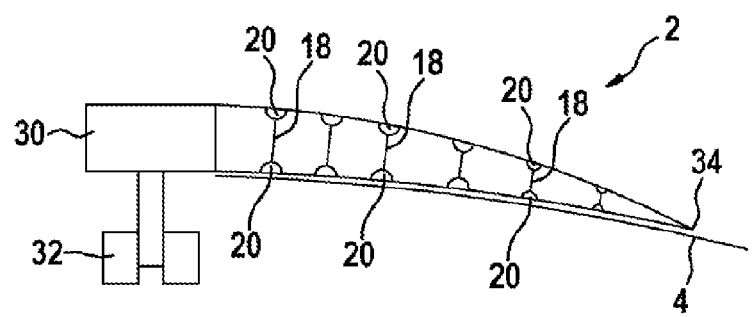
FIG. 7B is a schematic illustration of the wiper arm with an integrated wiper blade according to FIG. 7A in a position placed on a windshield.

FIG. 7B is a schematic illustration of the wiper blade 2 with integrated wiper arm according to FIG. 6B in a position placed on the windshield 4. Also in this instance, pressure forces act from below from the direction of the windshield 4 on the lower portion 12 of the wiper blade 2 so that the lower portion 12 and the upper portion 10 bend in the direction of the windshield 4.

Both in FIG. 6A and in FIG. 7A, the wiper blade is illustrated in the position thereof not placed on the windshield in such a manner that the lower portion 12 is constructed in a substantially straight manner. According to other embodiments which can be combined with other embodiments, the lower portion is constructed in a convex manner in the unloaded state, that is to say, with a curvature which protrudes away from the upper portion in a central region. The windshield wiper device according to the embodiments described herein can typically, in the event of contact with a windshield, starting from the convex shape of the lower portion, then assume the corresponding concave shape of the lower portion, which is adapted to the windshield.

Figure 8:
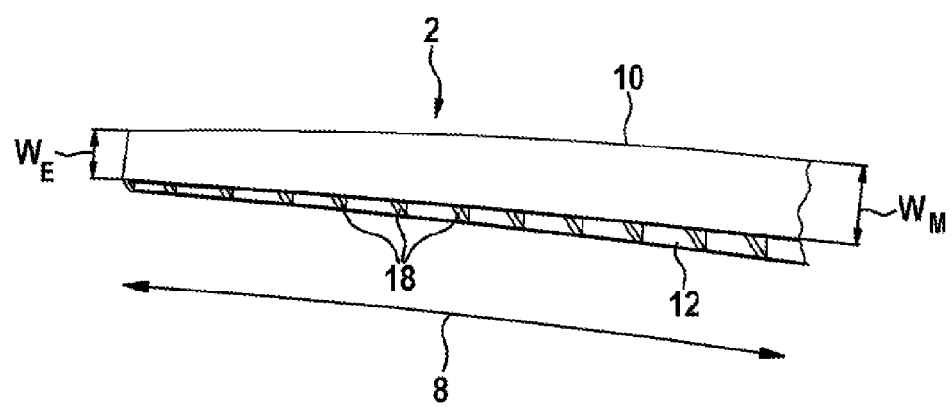
FIG. 8 is a schematic, perspective view of a wiper arm of a windshield wiper device according to embodiments of the disclosure.

FIG. 8 is a schematic, perspective illustration of a wiper blade 2 of a windshield wiper device according to embodiments of the disclosure. As illustrated in FIG. 8, the wiper blade 2 has at the outer connection positions, at which the ends of the elongate upper portion 10 and the lower portion 12 are connected to each other, an outer width $W_E$. According to typical embodiments, the outer width $W_E$ is at least 15 mm, in particular at least 20 mm, in particular at least 25 mm.

According to embodiments of the disclosure which can be combined with other embodiments, the width of the wiper blade 2 increases from the outer connection positions in the direction of the securing portion 30 or the retention member 6 to which the wiper blade on the windshield wiper arm can be secured. In FIG. 8, an inner width is designated $W_M$ by way of example. According to typical embodiments, the inner width $W_M$ is at least 20 mm, in particular at least 25 mm, in particular at least 30 mm.

Figure 9A:
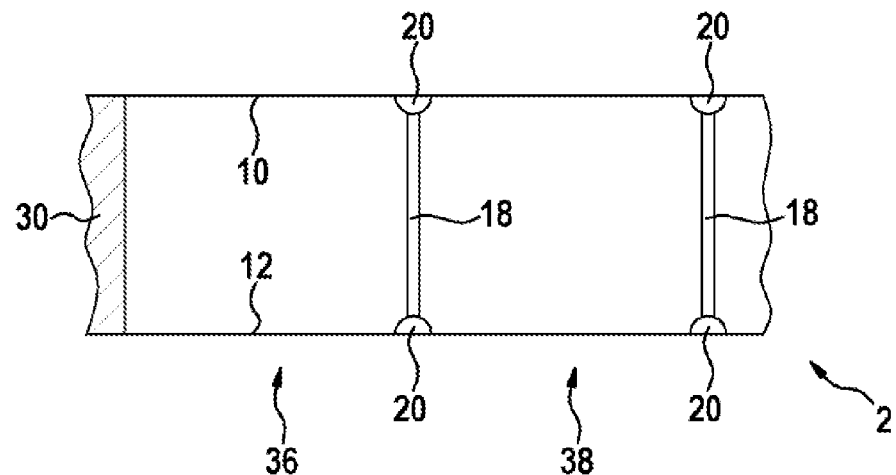
FIG. 9A is a schematic illustration of a cut-out of the wiper blade according to FIG. 7A.

FIG. 9A is a schematic illustration of a cut-out of the wiper blade 2 according to the embodiment according to FIG. 7A in which the wiper blade 2 is located in the basic position. The left end region of the wiper blade 2 in which an end of the upper portion 10 and an end of the lower portion 12 are secured to the securing portion 30 is illustrated. FIG. 9A shows starting from the transition from the securing portion 30 to the wiper blade 2 the first two connection elements 18 which delimit two wiper blade elements 36 and 38. The connection elements 18 are secured to the upper portion 10 and the lower portion 12 by means of pivot joints 20.

Figure 9B:
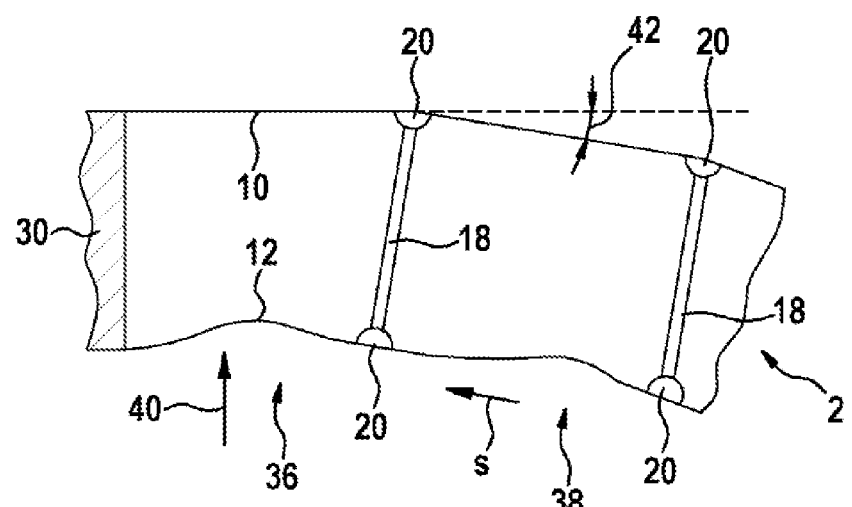
FIG. 9B is a schematic illustration of a cut-out of the wiper blade according to FIG. 7B.

FIG. 9B is a schematic illustration of a cut-out of the wiper blade 2 according to the embodiment according to FIG. 7B, in which the wiper blade 2 is placed on the windshield 4. Pressure forces act on the lower portion 12 from below from the direction of the windshield. In place of the pressure forces, a pressure force 40 is illustrated in FIG. 9B. The pressure force 40 brings about a curvature and bending of the lower portion 12 of the wiper blade element 36. The pivot joint 20 of the first connection element 18 is thereby displaced by a distance s to the left. The second wiper blade element 38 bends downward in the direction from which the pressure force 40 originates and fits closely against the windshield. An angle 42 is produced in this case between the first wiper blade element 36 and the second wiper blade element 38. There is further formed an additional pressure force which then acts on the lower portion 12 of the second wiper blade element 38 and prevents further bending of the second wiper blade element 38 in a downward direction. A chain reaction is produced with respect to the right-hand adjacent wiper blade element as far as the end of the wiper blade 2.

According to the embodiments described herein, Fin-Ray windshield wiper devices for vehicle windshields can be produced in a particularly cost-effective manner and/or for a plurality of different fields of application. The present embodiments of the windshield wiper device with the pretensioning device according to the embodiments described herein enable a particularly good adaptation to the curvature of a windshield. This ensures particularly good and precise wiping of the windshield. Regions of the windshield which are not wiped and a formation of haze on the windshield can be substantially prevented. The structural configuration of the pretensioning device described herein enables a substantially uniform pressing pressure of the windshield wiper device on the windshield so that a high wiping quality is provided.

What is claimed is:

1. A windshield wiper device for a vehicle, comprising a wiper blade (2) having
    an elongate upper portion (10) which is constructed so as to be at least partially bendable,
    an elongate lower portion (12) which is constructed so as to be at least partially bendable, and
    a plurality of connection elements (18) connecting the upper portion (10) and the lower portion (12), wherein the connection elements (18) are spaced apart from each other over a longitudinal extent (8) of the windshield wiper device, and wherein the connection elements (18) are configured to enable a movement of the upper portion (10) and the lower portion relative to each other with a movement component over the longitudinal extent (8) of the windshield wiper device, and
    a pretensioning device (50), wherein the pretensioning device (50) comprises a force receiving element (32) which is connected to a force transmission element (33) so that a rotational movement of the force transmission element (33) is brought about in the event of a force action on the force receiving element (32) in a direction of the elongate lower portion (12), whereby a movement of the elongate upper portion (10) results relative to the elongate lower portion (12) with a movement component over the longitudinal extent (8) of the windshield wiper device
    wherein the force transmission element (33) is connected at a first end via a first pivot joint (37) to the elongate upper part (10), and wherein the force transmission element (33) is connected at a second end via a second pivot joint (36) to the force receiving element (32);

wherein the force transmission element (33) is a first force transmission element, wherein the windshield wiper device includes a second force transmission element (33) connected at a first end via a third pivot joint (37) to the elongate upper part (10), and wherein the second force transmission element (33) is connected at a second end via a fourth pivot joint (36) to the force receiving element (32), wherein the second and fourth pivot joints (36) are disposed at opposite ends of the force receiving element (32).

2. The windshield wiper device as claimed in claim 1, wherein the pretensioning device (50) comprises a stop (31) which is spaced apart from the lower portion (12) in order to fix a ratio between a pretensioning force and a pressing force of the windshield wiper device (100).

3. The windshield wiper device as claimed in claim 2, wherein the stop (31) is connected to the force receiving element (32), and wherein the stop (31) is configured to limit a movement of the force receiving element (32) in the direction of the elongate lower portion (12) to a maximum movement path of 20 mm in the event of a force action on the force receiving element (32).

4. The windshield wiper device as claimed in claim 3, wherein the stop (31) is constructed in a pin-like manner and is arranged in order to form a stop in the case of the maximum movement path of the force receiving element (32) with the elongate lower portion (12).

5. The windshield wiper device as claimed in claim 2, wherein the stop (31) is constructed in a pin-like manner and is arranged in order to form a stop in the case of a maximum movement path of the force receiving element (32) with the elongate lower portion (12).

6. The windshield wiper device as claimed in claim 2, wherein the stop (31) is configured to transmit a force of at least 10 N to the elongate lower portion (12).

7. The windshield wiper device as claimed in claim 2, wherein the stop (31) is connected to the force receiving element (32), and wherein the stop (31) is configured to limit a movement of the force receiving element (32) in the direction of the elongate lower portion (12) to a maximum movement path of 15 mm in the event of a force action on the force receiving element (32).

8. The windshield wiper device as claimed in claim 2, wherein the stop (31) is connected to the force receiving element (32), and wherein the stop (31) is configured to limit a movement of the force receiving element (32) in the direction of the elongate lower portion (12) to a maximum movement path of 10 mm in the event of a force action on the force receiving element (32).

9. The windshield wiper device as claimed in claim 2, wherein the stop (31) is configured in order to transmit a force of at least 15 N to the elongate lower portion (12).

10. The windshield wiper device as claimed in claim 2, wherein the stop (31) is configured in order to transmit a force of at least 20 N to the elongate lower portion (12).

11. The windshield wiper device as claimed in claim 2, wherein the stop (31) is an elongate protruding member that extends perpendicularly from the force receiving element (32) toward the elongate lower portion (12).

12. The windshield wiper device as claimed in claim 1, wherein the force transmission element (33) is arranged in such a manner that, in an unloaded state of the windshield wiper device, an angle $\alpha$ between a longitudinal axis (35) of the force transmission element (33) and an axis (38) that is perpendicular to a direction of movement (60) of the force receiving element (32) is within an angular range of at least 15° to at maximum 60°.

13. The windshield wiper device as claimed in claim 1, further comprising a guide (34) configured to guide a movement of the force receiving element (32) in the direction of the elongate lower portion (12).

14. The windshield wiper device as claimed in claim 1, further comprising a wiper arm (40) configured to apply a pressure force to the force receiving element.

15. The windshield wiper device as claimed in claim 1, further comprising a tension production device (41) configured to apply a tensile force to the force receiving element.

16. The windshield wiper device as claimed in claim 1, wherein the force transmission element (33) is arranged in such a manner that, in an unloaded state of the windshield wiper device, an angle $\alpha$ between a longitudinal axis (35) of the force transmission element (33) and an axis (38) that is perpendicular to a direction of movement (60) of the force receiving element (32) is within an angular range of at least 20° to at maximum 45°.

17. The windshield wiper device as claimed in claim 1, wherein the force transmission element (33) and the force receiving element (32) are each an elongate linkage member, wherein the force receiving element (32) has a length that is shorter than the length of the force transmission element (33).

18. The windshield wiper device as claimed in claim 1, wherein the first force transmission element (33) and the second force transmission element (33) are each arranged in such a manner that, in an unloaded state of the windshield wiper device, a first angle $\alpha$ between a longitudinal axis (35) of the first force transmission element (33) and an axis (38) that is perpendicular to a direction of movement (60) of the force receiving element (32) is equal to a second angle $\alpha$ between a longitudinal axis of the second force transmission element (33) and the axis (38) that is perpendicular to the direction of movement (60) of the force receiving element (32).

19. The windshield wiper device as claimed in claim 1, wherein the force receiving element (32) extends parallel to the elongate lower portion (12), and is offset from the upper portion (10) along a direction of movement (60) of the force receiving element (32).

* * * * *